Figure 1:
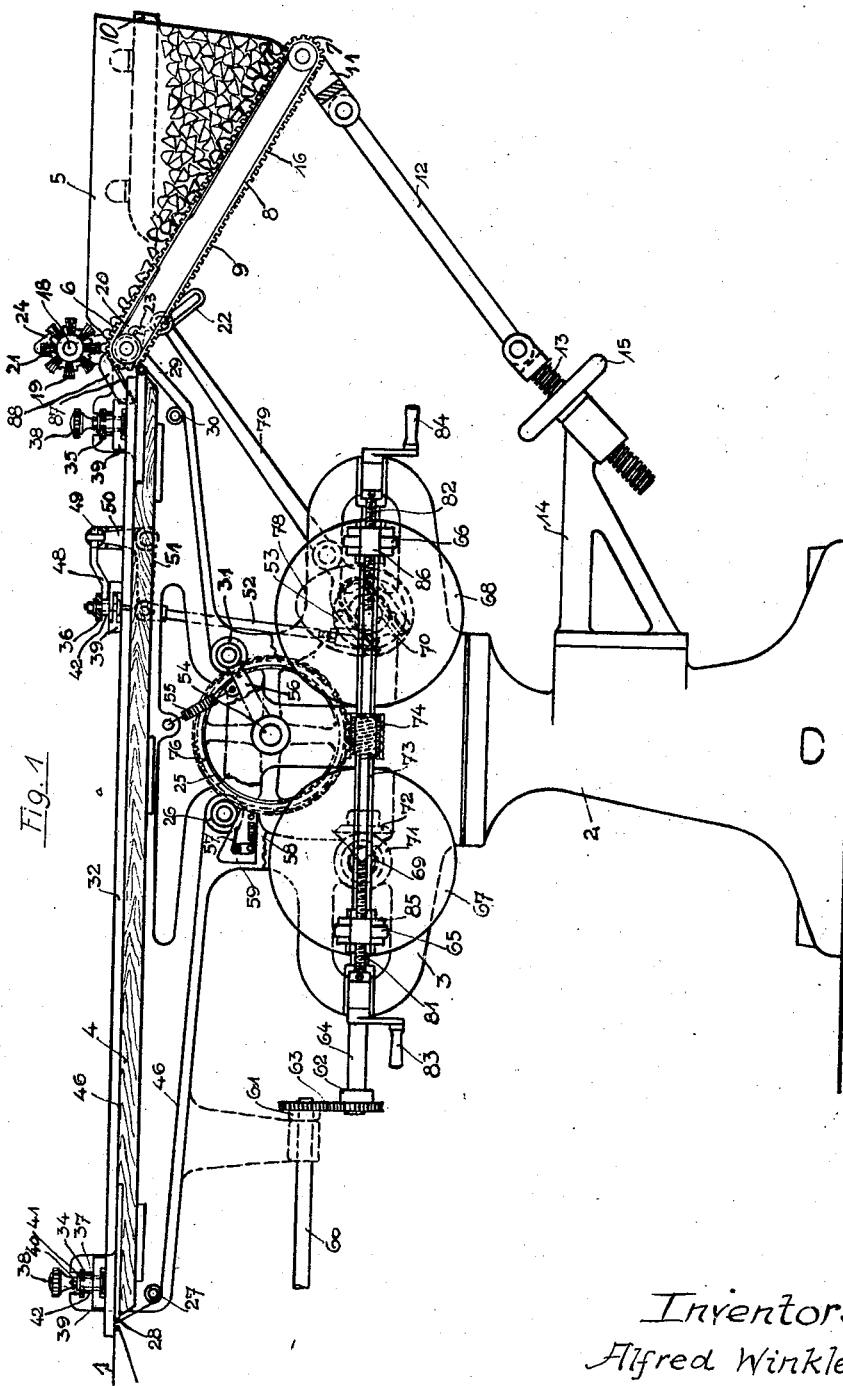
Figure 2:
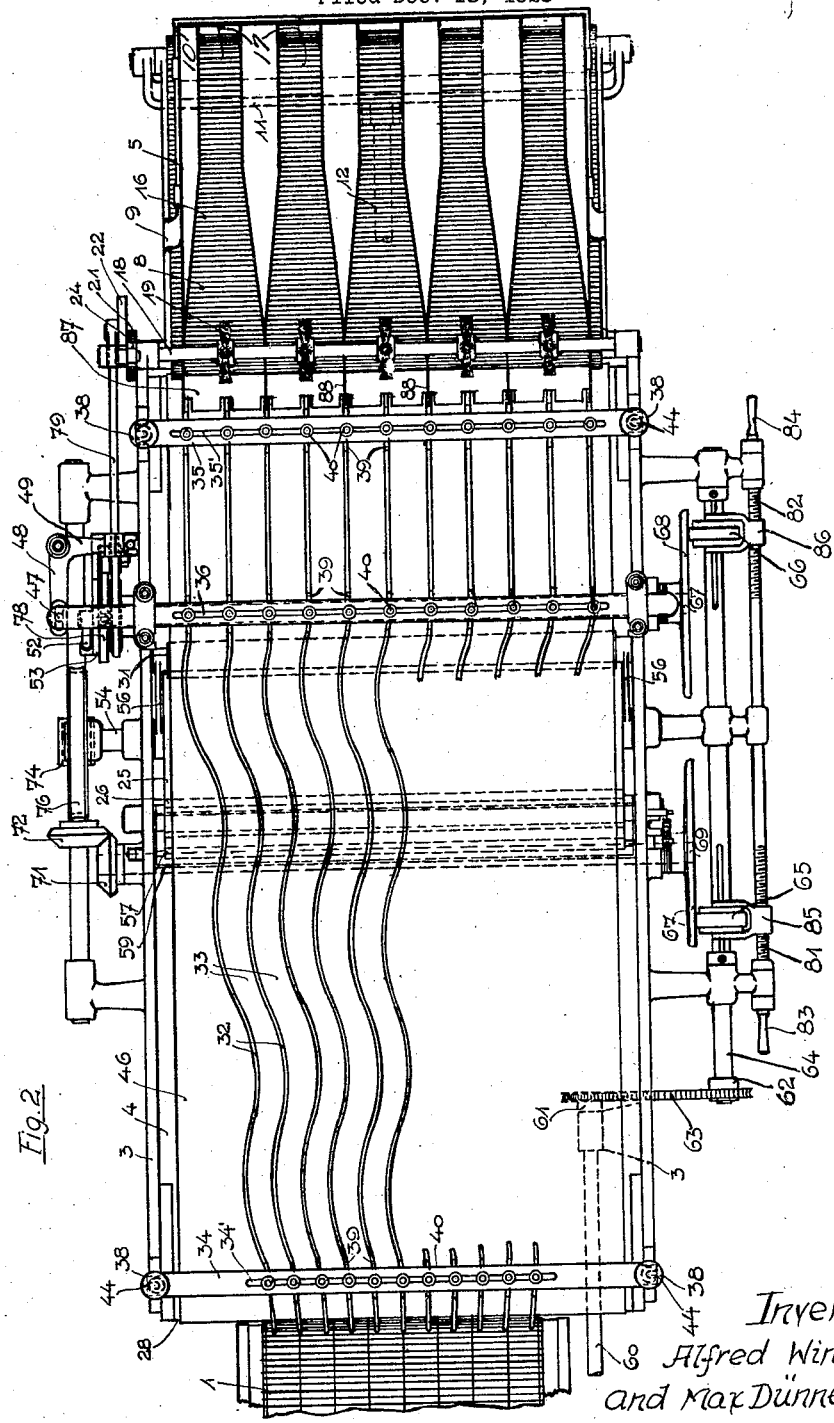

April 22, 1930.  A. WINKLER ET AL  1,755,720
APPARATUS FOR HANDLING ARTICLES
Filed Dec. 18, 1928  3 Sheets-Sheet 2

Inventors
Alfred Winkler
and Max Dünnebier
By Wm Wallace White
Attorney.

April 22, 1930.  A. WINKLER ET AL  1,755,720
APPARATUS FOR HANDLING ARTICLES
Filed Dec. 18, 1928    3 Sheets-Sheet 3

Inventors.
Alfred Winkler
and Max Dünnebier
By Wm Wallace White
Attorney

Patented Apr. 22, 1930

1,755,720

UNITED STATES PATENT OFFICE

ALFRED WINKLER AND MAX DÜNNEBIER, OF NEUWIED, GERMANY

APPARATUS FOR HANDLING ARTICLES

Application filed December 18, 1928, Serial No. 326,782, and in Germany December 19, 1927.

The invention relates to an apparatus by means of which the articles or work-pieces, such as bodies of sugar, fondants, and the like, which have to be operated on in a separate machine, are arranged in the upright position in which it is desired to operate on them and are supplied to the machine at regular distances apart and separated from one another as regards varieties.

Apparatus is already known in which the work-pieces are supplied to a charging container having an open bottom and rails lying below it which extend to a distance beyond the container, and in which they are withdrawn from the container by means of a horizontal conveyor band and are separated from one another by means of several conveyor bands which are arranged one behind another and run at gradually increasing speeds. In other known kinds of apparatus a delivery table is arranged for the reception of the unsorted and mixed work-pieces from which they are delivered intermittently by means of a charging apparatus in small quantities on a conveyor band over which straight guide rails are provided for arranging the work-pieces in rows. In both apparatus a shaking movement of the charging container or delivery table and in part also of the guide rails in a direction which is transverse to the path of the work piece, is employed and the object of this movement is on the one hand to bring the pieces continuously from the charging container or supply table on to the conveyor band and it has in addition the very important object of throwing the pieces backwards and forwards until they rest on their proper bottom surfaces and so assume the position which is necessary for their further treatment, for example being coated.

This method of arranging the work-pieces in an upright position is however with all the apparatus hitherto known not as certain as is desired because the pieces are not shaken sufficiently and because the greatest shaking is not effected at the moment and at the place where its greatest effect would be ensured. Further the uniformity hitherto obtained with regard to the distribution of the pieces and the regularity of their supply to the machine in which they are to be further treated left much to be desired, because they were delivered too irregularly from the charging container to the conveyor band. In all cases also the disadvantage is present that the charging container or the delivery table takes part in the shaking movement, that is to say a relatively large mass has to be set in oscillation.

In the apparatus in accordance with the present invention regard is paid to eliminating the aforesaid drawbacks. The guide rails are bent in wavy lines and therefore the pieces must strike more often against them. The construction and arrangement of the charging container which is subdivided for the separate reception of the different kinds of pieces ensures a delivery of the work pieces in the greatest possible uniformity, and care is also taken that any irregularities which may occur are equalized by means of an additional apparatus. The container itself is stationary and does not take part in the oscillation, and the shaking movement for setting the pieces upright is on the contrary so effected that the highest efficiency is ensured. Further the possibility of adjusting the speeds of the conveying means and the frequency and the size of the intermittent movements which, so far as is necessary, are made to depend positively one upon another together with the easy interchangeability of whole groups of parts enable the machine to be suitably adapted to all kinds of work-pieces with which it may have to deal. Also for avoiding disturbances due to impurities a novel arrangement is employed.

Figure 3:
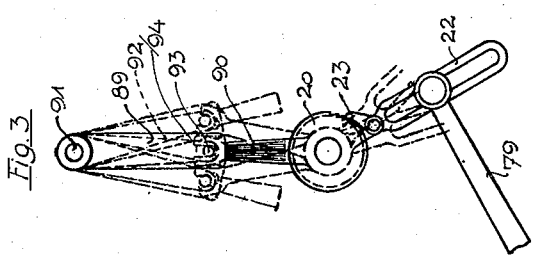

The invention is illustrated by way of example in the accompanying drawings, in which Fig. 1 is a side elevation of the machine partly in section,

Fig. 2 a plan,

Fig. 3 a second form of construction of a detail of the apparatus, and

Figure 4:
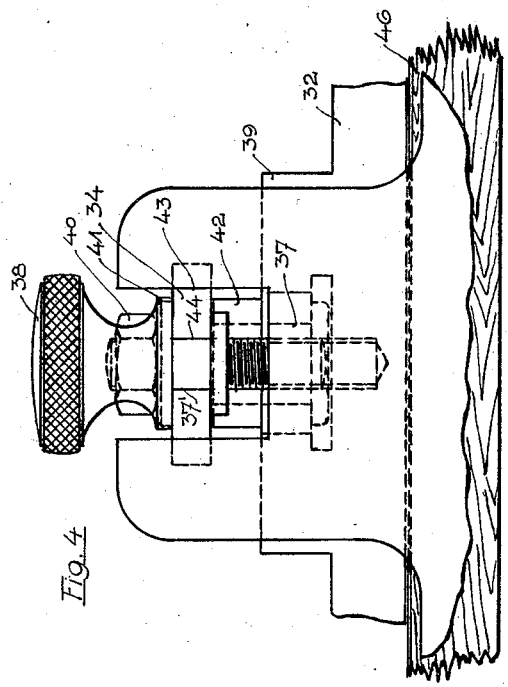
Figure 6:
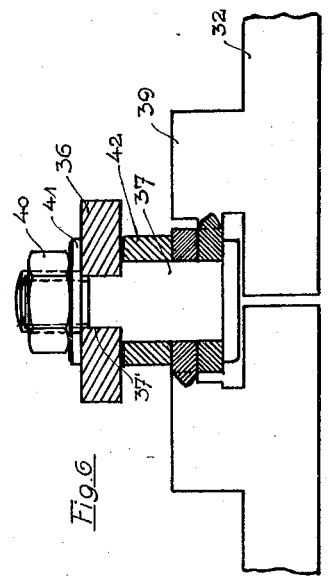
Figure 5:
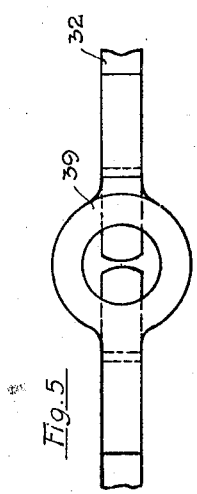

Figs. 4-6 are various details.

Referring to the drawings, the complete machine is so arranged that it can be erected in front of a machine for carrying out a further operation, for example in place of the delivery table of a coating machine, in such a manner that the work-pieces from it arrive directly on the coating grid 1 of the latter. The machine consists essentially of the pedestal 2 which carries side walls 3 between which a table 4 rests. A charging container 5 is arranged at the rear end of the table 4. This forms a box which is closed at both sides and at the rear and is open in front and on top. Its bottom is formed by a conveyor band 8 which passes over two rollers 6 and 7 and is inclined upwards towards the table 4. The roller 6 is journalled in the side walls 3 of the machine. Its shaft carries at the same time the one end of the side pieces 9 of the frame 10 which carries the container 5 and in the other end of which the roller 7 of the conveyor band 8 is journalled. The shaft of the roller 7 is carried in a bow-shaped member 11 to the centre of which a stay 12 is linked and is supported on a spindle 13. This spindle is guided in a bracket 14 fixed to the pedestal 2 and carries a hand wheel 15 provided with a screw thread so that by turning the hand wheel the rear end of the charging-container 5 can be raised or lowered. The surface of the conveyor band 8 is roughened and in the example illustrated transverse grooves 16 extending across the entire width of the band are provided. The interior of the container 5 is subdivided into separate compartments 17 which are narrower at their rear ends, that is to say at the deepest part than in front. Above the roller 6 in arms which project upwardly from the side walls 3 on both sides of the machine there is journalled a shaft 18 which carries in the middle of each outlet of the compartments 17 a circular brush 19. The shaft of the roller 6 and also the shaft 18 each carry a ratchet wheel 20 and 21 respectively both of which are driven by means of pawls 23 and 24 respectively fitted on a lever 22 which is revolubly fastened on the shaft of the roller 6.

A conveyor band 46 which is driven from the drum 25 and guided by the rollers 26, 27, 28, 29, 30 and 31 is carried over the table 4. Guide rails 32 are arranged above the band, the number of them being such that the guide tracks 33 formed thereby correspond to the number of longitudinal rows of work pieces to be formed. These guide rails 32 are straight for about a quarter of their total length from the charging container 5 and are then bent in the form of wavy lines. At their front and rear ends near the rollers 28 and 29 respectively and at the transitional place from the straight to the wavy form they are connected together by means of cross-rails 34, 35 and 36 in such a manner that each of them has a pivoting point about a bolt 37. The front and rear cross rails 34 and 35 are screwed fast to the side walls 3 of the frame of the machine by means of screws 38 while the central rail 36 is transversely displaceable and for this purpose is carried in guides which are fastened to the side walls 3. In this way the guide rails 32 can be bent in common in both directions at the place where they are fastened to the cross rail 36, by moving the latter sidewise, so that they swing about the points at which they are fastened to the cross rails 34 and 35. In order to enable this sidewise bending to be carried out the guide rails 32 can be made of elastic material. For this purpose it is, however, necessary to arrange longitudinal slots at the turning points of the rails. In the constructional example illustrated the guide rails are divided at the fastening points to the middle cross-rails 36, each of them therefore actually consists of two parts. For their revoluble fastening to the front and rear cross-rails 34, 35 respectively the guide rails carry at these places a bow-like member 39 which is screwed on or otherwise fastened to them and is provided in the middle of its bridge with a longitudinal hole in which a headed bolt 37 (see Fig. 4) is introduced before the bow is fastened to the rail. This has at 37' lateral flats so that it fits in slots 34' and 35' of the cross-rails 34 and 35 and is at the same time secured against rotation. The lower surface of the cross-rails 34 and 35 lies against the upper surface of the flats 37'. The bolt 37 can in this manner be screwed fast to the cross-rail by means of a nut 40, a washer 41, being interposed, and secured against displacement, whereas the bow-like member 39 of the guide rail 32 remains revoluble about the bolt 37. The length of the circular stem of the bolt 37 gives the distance of the guide rails 32 from the cross-rails 34 and 35 and an intermediate ring 42 ensures this distance being kept. The cross rails 34 and 35 fit between the side walls 3 of the machine and their ends 43 are reduced in width and also possess slots 44 in which screws 38 are guided. These screws are screwed into the side walls 3, so that the height of the cross rails and therefore also of the guide rails can be adjusted by them whereby the distance of the latter from the conveyor band 46 can be regulated.

The fastening of the guide rails 32 to the central cross rail 36 is the same as previously described but in this case the bow-like member 39 is divided in such a manner that one of each of its halves is fastened to the ends of the rails which abut at this place. Both halves project over one another and carry together the aperture, which is in this case circular, for the passage of the bolt 37.

A pin 47 is fitted to one end of the lower sides of the cross rail 36 with which pin one arm 48 of an angle-lever engages. The other arm 49 of this angle-lever is in engagement with the interposition of the necessary link or joint with one arm 50 of a second angle-lever with the second arm 51 of which a crank rod 52 engages, which crank-rod is moved by means of a crank or eccentric 53. In this way the sidewise movement of the cross-rail 36 and with it also the alternating sidewise bending of the guide rails 32 is carried out.

Of the guide rollers of the conveyor band 46 the roller 31 acts as a tensioning roller, and for this purpose it is journalled in a pair of levers 56 which are acted upon by a tension spring 55 and are revolubly fixed on the shaft 54 of the drum 25. In order to be able directly to remove the remains of sugar etc. adhering to the conveyor band 56 the guide roller 26 is constructed as a cleaning roller. It is made of metal and its surface is not very flat so that the conveyor band 46 passing over it gives up to it all the adhering remains of sugar, etc. owing to the pressure between them. A scraper 57 which is pressed against the roller 26 by means of a spring 58 removes the sugar from it which falls into a receptacle 59.

At the place where the two conveyor bands 8 and 46 meet there is interposed an inclined slide 87, which is inclined forwardly towards the conveyor band 46. It is provided with partition walls 88 corresponding with those of the container 5.

The drive of the complete machine is effected from the longitudinal shaft 60 which is carried in guides along the coating machine and formerly served the purpose of driving the delivery conveyor band. A chain 63 drives from it by means of the chain wheels 61 and 62 the shaft 64 on which two friction wheels 65 and 66 which are displaceable in the longitudinal direction are arranged. These wheels engage with friction discs 67 and 68 respectively, the shafts 69 and 70 of which run transversely to the machine and are journalled in the two side pieces 3. At the opposite end of the shaft 69 to the friction disc 67 there is mounted a cone-wheel 71 which engages with a second cone wheel 72 the shaft 73 of which is journalled on this side of the machine and carries a worm 74 which drives a wormwheel 76 fixed on the shaft 54 of the drum 25. By this means the drive of the delivery band 46 is effected.

The second friction wheel 66 drives the friction disc 68. Its shaft 70 carries a cam 78 on the opposite side of the machine which effects the movement of the lever 22 through the agency of the rod 79, whereby the intermittent movement of the conveyor band 8 and the partial rotation of the circular brush 9 is effected through the agency of the ratchet wheel 20. There is also mounted on the shaft 70 an eccentric 53 by which the sidewise movement of the transverse rails 36 and therefore the bending of the guide rails 32 is effected through the agency of the crank-rod 52 and the two angle levers 50, 51 and 48, 49.

In front of the shaft 64 of the friction wheel and parallel to it there are arranged two spindles 81 and 82 provided with handles 83 and 84 respectively which serve the purpose of displacing the friction wheels 65 and 66 along their shafts. For this purpose the spindles 81 and 82 each carry a double forked part 85 and 86 respectively which are internally threaded and are guided along the shaft 64 of the friction wheels and embrace the friction wheels 65 and 66 so that they are secured in position in the longitudinal direction of their shaft 64 after they have once been adjusted in position on it.

As will be clear from the foregoing the speed of the conveyor band 46 can be altered as desired while the speed of revolution of the shaft 60 remains unchanged by moving the friction wheel 65, while by moving the friction wheel 66 the frequency of the movements of the conveyor band 8 and the sidewise bending of the guide rails 32 can be regulated. The two latter movements are in this manner brought into dependence one upon the other. Moreover provision is made for the adjustment of various detail parts. Thus the lever 22 for moving the band 8 is provided with a longitudinal slot whereby the length of stroke and therefor the length of each movement of the band 8 as also the angle of the partial rotational movement of the circular brush 19 can be altered. In order to be able to alter the stroke of the cross rails 36 for performing the sidewise bending of the guide rails 32 the eccentric 53 is provided with a number of holes at different distances from the center of rotation (see Fig. 1), and any selected hole serves for the reception of the crank pin. Further the arm 51 of the double armed lever with which the crank rod 52 engages can be provided with a longitudinal slot (which is not illustrated in the drawings) for additional adjustment of the shaking stroke.

It is necessary that the cross section of the guide rails 32 should suit the different forms of the work-pieces in order to ensure that the pieces are set upright. For this reason the apparatus is so arranged that the complete system of guide rails 32 can be removed and replaced by another, which also forms a system complete in itself, by simply loosening the four screws 38.

The following is a description of the novel method operation of the entire apparatus.

The employment of an upwardly inclined conveyor band 8 as the bottom of the charging hopper 5 has the effect in the first place that the work-pieces collect and pack themselves closely together at the deepest part of the compartments 17 of the hopper. On the continued intermittent movement of the conveyor band 8 a limited number of pieces are carried upward with it and, in so far that they still lie one above the other, are gradually separated. In order to make this separation still more certain the compartments 17 are widened out towards the top. Therefore, the nearer the pieces approach the hopper outlet the greater is the lateral freedom which they have. The result is that the pieces are already given a shaking movement owing to the intermittent movement of the conveyor band 8 and some of them consequently place themselves upright upon this band. The separation of the individual pieces on their way upwards becomes the more certain the more steeply the conveyor band 8 is inclined, at the same time, however, increasing inclination also favours the falling backwards of the pieces, therefore in order to assist the former and avoid the latter the surface of the conveyor band 8 is roughened, most advantageously by the provision of cross grooves 16. The action of the band in setting the pieces upright is thereby simultaneously increased.

As stoppages may occur at the hopper outlet owing to pieces becoming jammed between the side walls of the compartments 17 the circular brush 19 is provided. In the arrangement illustrated in Fig. 1, after each movement of the band 8 has been completed, the circular brush makes a partial rotation in a counter-clockwise direction and thereby pushes backwards any pieces which may have jammed so that the track is free for the remaining pieces.

A second form of construction of an apparatus for preventing stoppages at the hopper outlet is illustrated in Fig. 3. In this case, instead of circular brushes, there are provided backward and forward oscillating levers 89 each of which is provided with a brush 90 and screwed to a common shaft 91. They are fitted in the same position as the circular brushes 19 (Fig. 1) namely in the middle of the outlets of the hopper compartments 17. Instead of the ratchet wheel 21, a lever 92 is screwed on the shaft 18 and it carries a pin 93. This pin engages in a slot 94 in the upwardly projecting arm 22' of the lever 22 so that the backward and forward oscillating movement of the arm 22' is also transmitted to the lever 92 and thereby to the lever 89 which carries the brush 90. The action of maintaining the outlets of the container 5 free operates in this case in both directions.

From the conveyor band 8 the pieces, as previously mentioned, arrive at the conveyor band 46, which is guided over the table 4, in a relatively good and uniform state of distribution and in fact reach the separate tracks formed by the guide rails 32 separated according to varieties. In the example illustrated it is assumed that two guide tracks 33 run into each compartment 17 of the hopper 5 so that each of the two tracks receive similar pieces and altogether five different varieties are set out in ten rows. This method of division can of course be altered as desired.

The object in view is to arrange the pieces in rows on the conveyor band 46 as closely as possible one after another. By regulating the difference of speed between the coating grid 1 of the coating machine and the conveyor band 46 then any distance between the pieces which may be desired on the coating grid 1 can be obtained without further trouble. In order to arrange the pieces on the conveyor band 46 closely one behind another it is essential that the supply from the container 5 should be entirely free from interruptions and should be uniform. By interposing the slide 87 between the conveyor band 8 and the conveyor band 46 it becomes possible to neutralize any inequalities in the supply which may have occurred. If for example for some reason a disturbance in the supply from the container 5 occurs so that for example the last supplied piece has already moved forward on to the band 46 a short distance from the end of the slide 87 the next piece rolls or slides forwards, owing to the speed given to it on the steep surface of the slide 87, until it knocks against the piece in front. In this way any inequalities in supply are got rid of and gaps in the rows of pieces on the band 46 are avoided.

For setting upright any pieces which reach the conveyor band 46 in a reversed condition shaking, which is known per se, is employed. Whereas however with all known devices the greatest shaking takes place at a place where the pieces have not yet been sufficiently distributed, because in such cases the shaking must also simultaneously assist the distribution, according to the invention the greatest shaking only takes place after the pieces have had the opportunity of distributing themselves so that each individual piece is acted upon with a fair degree of certainty by the shaking movement of the sidewise reciprocating guide rails 32. This place is of course at some distance from the place at which the pieces are supplied to the conveyor band 46 because the possibility of the accumulations is much less at this point than directly at the point of supply. For this reason the guide rails 32 swing about both ends and make their greatest movement at a point between the ends, namely, in the example illustrated, at the point where they are fixed to the cross rails 36. This arrangement is possible in the apparatus in accordance with the invention only because the shaking movement of the guide rails solely serves the purpose of setting the pieces upright and is not, or only to a very small extent, employed for distributing them as was the case with the known apparatus because the pieces were then not supplied to the conveyor band sufficiently well distributed. If the setting upright of all work pieces is to be ensured they must be guided very often against the rails 32, therefore these are best in wavy lines.

In order to make full use of a machine of the kind in question it is of the greatest importance, in view of the numerous kinds of work-pieces or articles to be treated, that it is possible in all cases to make the supply and other movements correctly agree with one another. Very small pieces require, as compared with larger pieces, a more frequent and smaller intermittent movement of the conveyor band 8 and also that the shaking movements of the guide rails 32 should follow in more rapid succession. The movements therefore must be made to depend on one another as is the case in the apparatus according to the invention which has been hereinbefore described. The conveyor band 46 when smaller pieces are being treated, must on the contrary, run more slowly because even with small pieces their close packing together in rows one behind another on the band appears to be indicated for the economical working of the machine. With large pieces the requirements are the opposite. In this case less frequent but greater individual movements of the conveyor band 8 are necessary and the shaking movements of the guide rails 32 can be smaller in number. The shaking stroke on the other hand must be greater. The conveyor band 46 must also run faster in order that the larger pieces may take a position on it in close succession to one another. The necessary inclination of the conveyor band 8 depends also on the size and weight of the pieces and finally as previously mentioned the guide rails 32 must be adopted to correspond for the different kinds of pieces. Regard is paid in accordance with the invention to the necessity for all these various adjustments and in addition to the advantages previously mentioned the new machine may be considered to have made a considerable technical advance over the known machine in respect of practical requirements.

What we claim is:

1. Apparatus of the character described for the supply of articles in an upright position, comprising conveying means for the articles, guide rails of wavy form, and means for moving said rails transversely to the direction of movement of the said conveying means, for shaking the said articles and bringing them to upright positions.

2. Apparatus of the character described for the supply of articles in an upright position, comprising a container for the articles, an inclined endless travelling band forming the bottom of the container and serving to raise the articles, a second conveyor band for carrying said articles, a plurality of waved tracks of flexible material and means for imparting side movements to said tracks for the purpose described.

3. Apparatus of the character described for the supply of articles in an upright position comprising a container for the articles, an inclined endless travelling band forming the bottom of the container and serving to raise the articles, an inclined slide for receiving the articles from said band, a second conveyor band for carrying said articles, a plurality of waved tracks of flexible material and means for imparting side movement to said tracks for the purpose described.

4. Apparatus of the character described for the supply of articles in an upright position, comprising a container for the articles, partition walls dividing the container into a plurality of compartments for the accommodation of different varieties of articles, a common endless band forming an inclined bottom for said compartments and serving to raise the articles therefrom, a second conveyor band for the articles, a series of waved rails dividing the latter band into a plurality of tracks for the articles, and means for flexing said rails in a transverse direction to shake and arrange the articles in said tracks.

5. Apparatus of the character described for the supply of articles in an upright position, comprising a container for the articles, an inclined endless travelling band forming the bottom of the container and serving to raise the articles, a second conveyor band for carrying said articles, a plurality of waved tracks of flexible material, end pivots for said tracks, a crossbar connecting said tracks between their ends and means for reciprocating the crossbar and thus imparting transverse swinging movement to the tracks and shaking and arranging the said articles.

6. Apparatus according to claim 2, comprising means for varying the inclination of the bottom of the container to control the supply of the articles therefrom.

7. Apparatus according to claim 2, comprising means on the surface of the said inclined band for preventing sliding of the articles thereon.

8. Apparatus of the character described for the supply of articles in an upright position, comprising a container for the articles, partitions dividing the container into a plurality of compartments and shaped so that the width of each compartment increases towards the outlet thereof, conveying means for the articles, guide rails of wavy form, and means for moving said rails transversely to the direction of movement of the said conveying means, for shaking the said articles and bringing them to upright positions.

9. Apparatus according to claim 2, comprising means for imparting intermittent movement to the inclined band to raise the articles from the container.

10. Apparatus according to claim 2, comprising means for imparting intermittent movement to the inclined band to raise the articles from the container, and means for regulating the frequency of said movements.

11. Apparatus according to claim 2, comprising means for imparting intermittent movement to the inclined band to raise the articles from the container and means for varying the length of the said intermittent movements.

12. Apparatus according to claim 2, comprising means for imparting intermittent movement to the inclined band to raise the articles from the container, means for regulating such intermittent movement in accordance with the side movements of said tracks and means for the independent adjustment of the speed of movement of the said second conveyor band.

13. Apparatus according to claim 4, comprising an inclined guide for receiving the articles from said compartments and depositing same upon the second conveyor band.

14. Apparatus according to claim 1, comprising a plurality of cross members, means for pivotally securing said guide rails to the cross members and means for removably mounting the cross members on the apparatus so that the guide rails may be removed as a unit with said cross members.

15. Apparatus according to claim 1, comprising stationary cross-bars mounted above the said conveying means, screws connecting said guide rails pivotally to said cross-bars and an intermediate movable bar also connected to said rails.

16. Apparatus according to claim 1, comprising stationary cross-bars removably mounted on the apparatus, and screw means pivotally connecting the guide rails to said bars and serving to adjust the said rails vertically towards or away from the surface of the said conveying means.

In testimony whereof we have signed our names to this specification.

ALFRED WINKLER.
MAX DÜNNEBIER.